(12) United States Patent
Theurer et al.

(10) Patent No.: US 7,048,256 B2
(45) Date of Patent: May 23, 2006

(54) METHOD AND MACHINE FOR INSTALLING A CATENARY CABLE

(75) Inventors: Josef Theurer, Vienna (AT); Leopold Gruber, Scheibbs (AT)

(73) Assignee: Franz Plasser Bahnbaumaschinen-Industrie-Gesellschaft mbH, Vienna (AT)

( * ) Notice: Subject to any disclaimer, the term of this patent is extended or adjusted under 35 U.S.C. 154(b) by 98 days.

(21) Appl. No.: 10/683,721

(22) Filed: Oct. 10, 2003

(65) Prior Publication Data

US 2004/0075010 A1 Apr. 22, 2004

(30) Foreign Application Priority Data

Oct. 17, 2002 (AT) ............................ GM 689/2002

(51) Int. Cl.
*B65H 59/00* (2006.01)

(52) U.S. Cl. ............................................. 254/134.3 R

(58) Field of Classification Search ......... 254/134.3 R, 254/134.3 PA, 134.3 FT, 310, 321, 356, 378; 242/86.7, 86.5, 86.51, 54 R, 155 BW; 212/159
See application file for complete search history.

(56) References Cited

U.S. PATENT DOCUMENTS

| 4,624,450 | A | * | 11/1986 | Christison .................... 254/273 |
| 5,114,119 | A | | 5/1992 | Theurer et al. |
| 5,826,860 | A | * | 10/1998 | Theurer et al. ....... 254/134.3 R |

FOREIGN PATENT DOCUMENTS

EP 0 861 752 B1 9/1998

* cited by examiner

*Primary Examiner*—Robert C. Watson
(74) *Attorney, Agent, or Firm*—Laurence A. Greenberg; Werner H. Stemer; Ralph E. Locher

(57) ABSTRACT

During the installation of a catenary cable of a catenary of a track, the catenary cable is pulled from a storage drum, on which it is wound, and guided over winch wheels of a friction winch while being held under tension. From there, the catenary cable is passed onto a mounting roller with a pull-off resistance producing an installation tension. The pull-off resistance is created by the friction winch and counteracts a pull-off force of the catenary cable. Between the winch wheels of the friction winch, the cable tension is gradually increased up to the pull-off resistance.

3 Claims, 3 Drawing Sheets

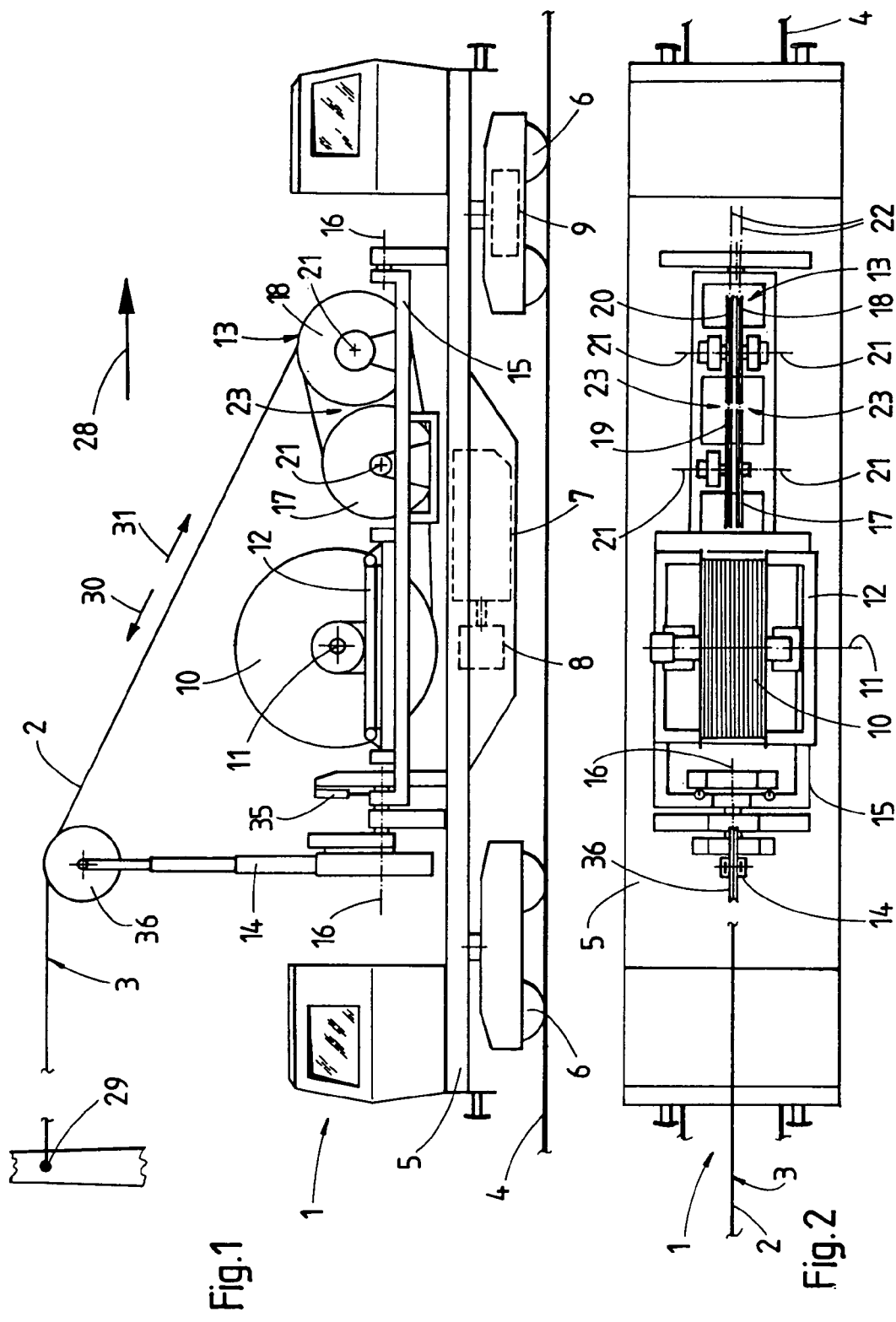

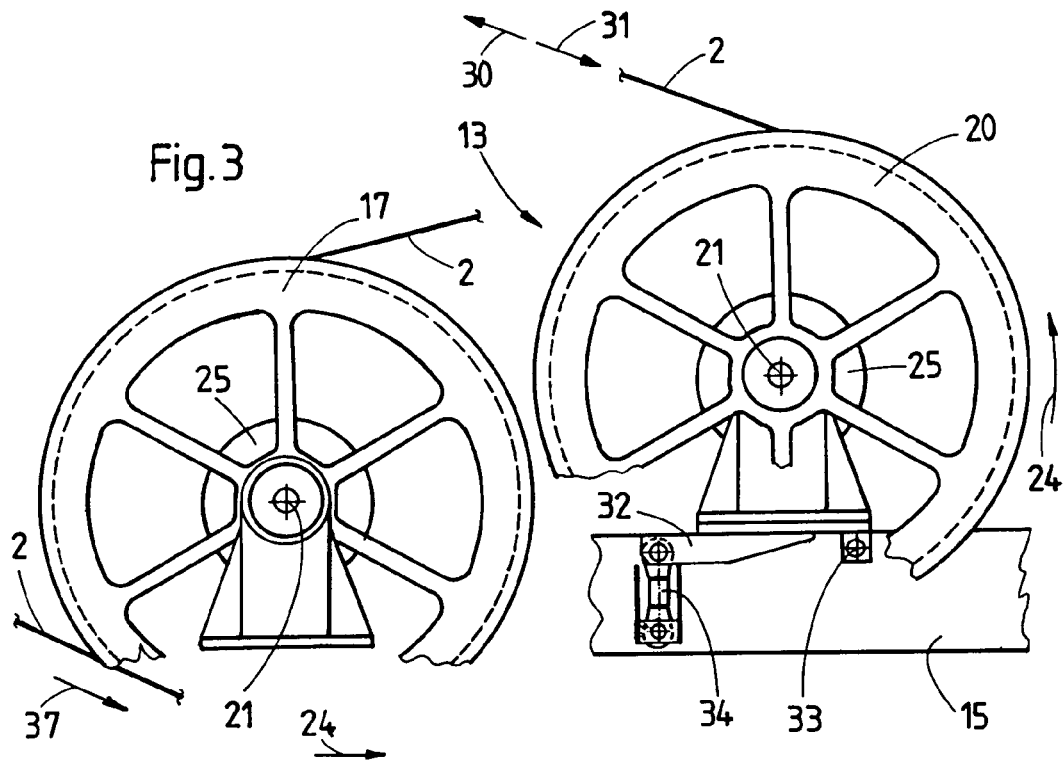
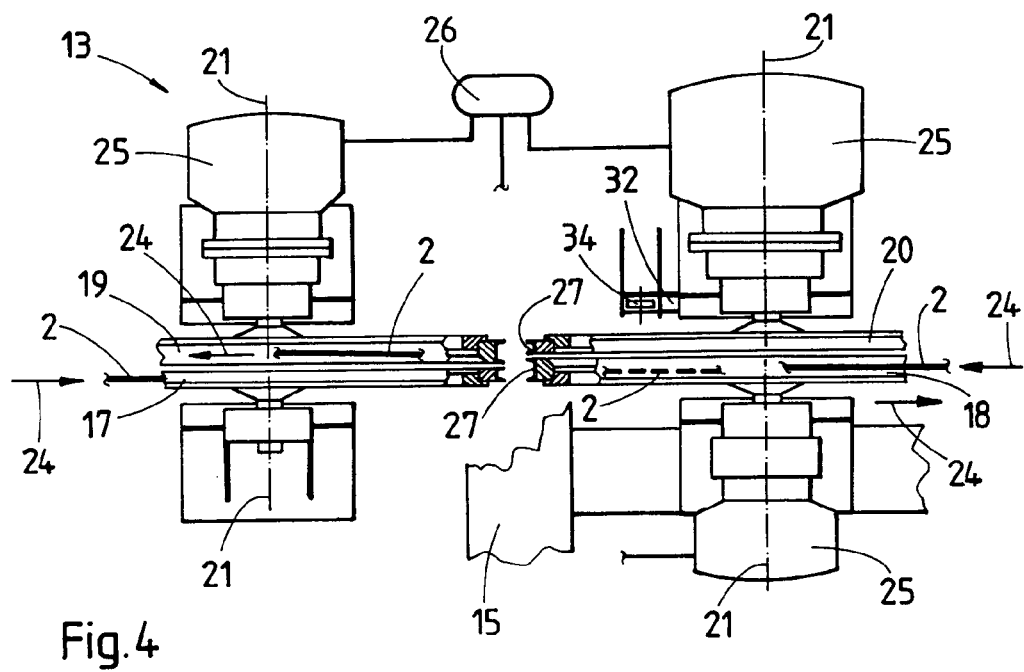

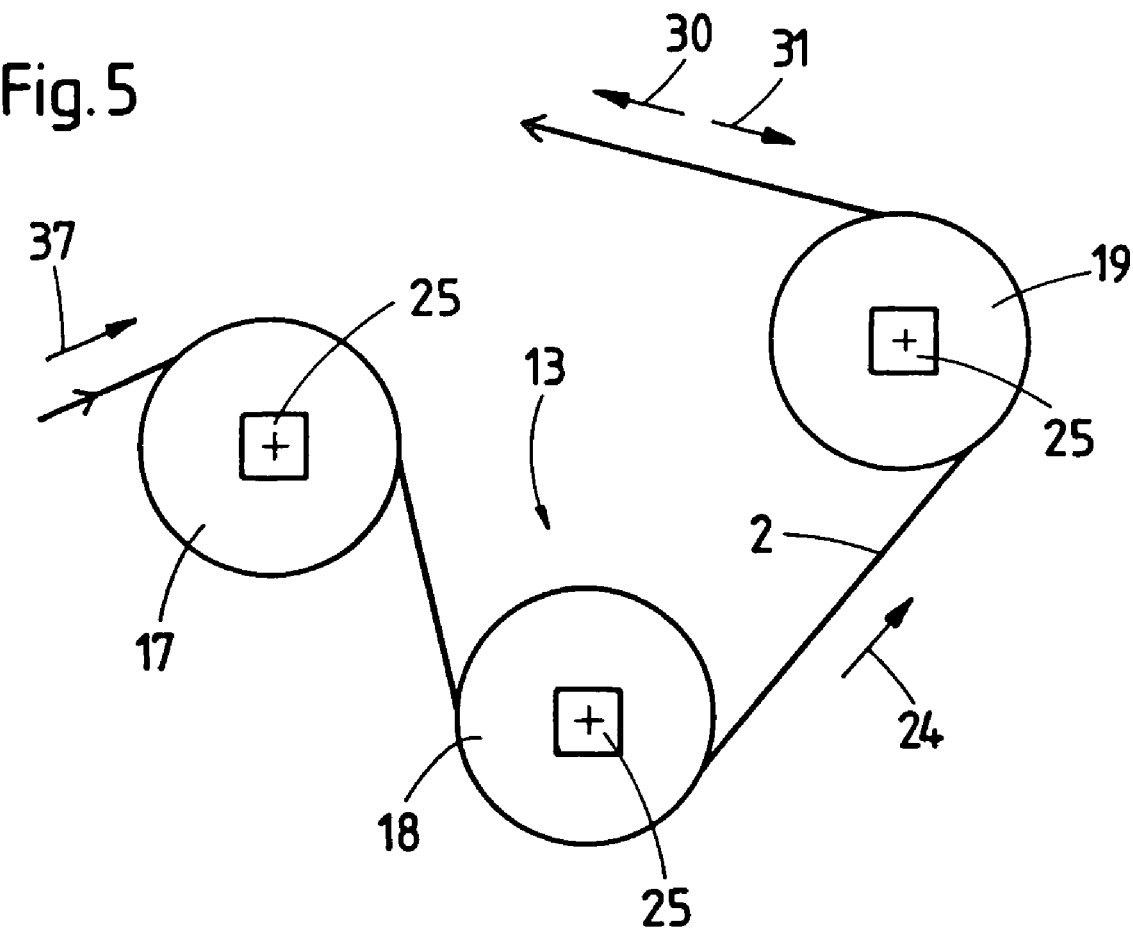

METHOD AND MACHINE FOR INSTALLING A CATENARY CABLE

BACKGROUND OF THE INVENTION

1. Field of the Invention

The present invention relates, in general, to a method of installing a catenary cable of a catenary of a track. The catenary cable is a contact wire or a carrying cable wound upon a storage drum.

2. Description of the Related Art

Our earlier U.S. Pat. No. 5,114,119 and European Patent No. 0 861 752 describe a method of this type, with which a contact wire and a carrying cable of an electrical catenary of a track can be installed together and with the final installation tension. To that end, contact wire and carrying cable are pulled continuously from a respective, separate storage drum and pass through a friction winch which serves as a tensile stress device, before they are positioned by means of a mounting roller in the correct vertical and lateral position for the final installation. The friction winch consists of two winch wheels, arranged one following the other in the longitudinal direction of the machine, which are driven by means of a common hydraulic motor.

SUMMARY OF THE INVENTION

It is an object of the present invention to provide a method and a device for installing a catenary cable that overcomes the disadvantages of the heretofore-known methods of this general type, and with which it is possible without problems to also pull from the storage drum catenary wires with a higher and constant installation tension.

With the foregoing and other objects in view there is provided, in accordance with the present invention, a method of installing a catenary cable, such as a contact wire or a carrying cable wound upon the storage drum, of a catenary of a track. The method comprises the steps of pulling the catenary cable from the storage drum with a drum pull-off force; guiding the catenary cable over winch wheels of a friction winch, the catenary cable being subject to a cable tension; and passing the catenary cable from the friction winch onto a mounting roller with a pull-off resistance for producing an installation tension, the pull-off resistance being created by the friction winch and counteracting a pull-off force of the catenary cable, wherein, between the winch wheels of the friction winch, the cable tension is gradually increased up to the pull-off resistance.

With the above and other objects in view there is also provided, in accordance with the invention, a machine for installing a catenary cable of a catenary of a track, the catenary cable being a contact wire or a carrying cable. The machine comprises a machine frame extending in a longitudinal direction and supported by undercarriages for mobility on the track; a storage drum mounted on the machine frame and containing the catenary cable; a mounting roller, supported for vertical adjustment on the machine frame, for guiding the catenary cable into the final installation position; and a friction winch, arranged between the storage drum and the mounting roller, for producing a pull-off resistance counteracting a pull-off force acting upon the catenary cable, thus creating an installation tension when the catenary cable is pulled from the storage drum. The friction winch is composed of four winch wheels rotatable independently of one another about respective axes of rotation, wherein two winch wheels at a time are arranged in a common plane, thus forming a wheel pair.

With a solution of this kind, it is possible in an advantageous way to increase the tension forces, acting upon cable grooves of the winch wheels, in steps from one winch wheel to the next in order to thus improve the force grip of the cable, until finally the desired installation tension comes to bear at the last winch wheel. Furthermore, with the possibility of arranging several hydraulic drives for separately driving each of the winch wheels independently of one another, the advantage is created that the pull-off forces may be varied without problems, as desired, over a broad bandwidth of about 5 to 50 kN (kilonewtons) and, above all, may also be kept constant.

In accordance with an added feature of the invention, the friction winch comprises two mutually parallel wheel pairs. Each of the wheel pairs comprises two winch wheels disposed one following the other in the longitudinal direction.

In accordance with an additional feature of the invention, each of the wheel pairs includes a front winch wheel and a rear winch wheel. The front winch wheels of the two wheel pairs are mounted on a common axis of rotation and the rear winch wheels of the two wheel pairs are mounted on a common axis of rotation, and the axes of rotation extend transversely to the longitudinal direction.

In accordance with another feature of the invention, there are provided separate hydraulic motors respectively associated with a second winch wheel, a third winch wheel, and a fourth winch wheel with regard to a winding direction of the catenary cable. In accordance with a preferred feature of the invention, the hydraulic motors have mutually different fluid displacement capacities.

In accordance with again an added feature of the invention, there is provided a control system connected to the hydraulic motors and configured to actuate the hydraulic motors separately and with different operating pressures.

In accordance with again an additional feature of the invention, each of the hydraulic motors is rated with a different maximum torque, and the maximum torque of the different motors increases in the winding direction of the catenary cable.

In accordance with again another feature of the invention, each winch wheel is formed with a cable groove for receiving the catenary cable, and the cable groove of the second and the third winch wheels, relative to the winding direction of the catenary cable, is wider than the cable groove of the first and fourth winch wheels.

In accordance with a concomitant feature of the invention, there is provided a support frame for supporting the storage drum together with the winch wheels, the support frame being mounted on the machine frame for pivoting relative thereto with the aid of a drive about an axis extending in the longitudinal direction.

Other features which are considered as characteristic for the invention are set forth in the appended claims.

Although the invention is illustrated and described herein as embodied in a method and machine for installing catenary cable, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a side view of a machine for installing a catenary;

FIG. 2 is a top view of the machine of FIG. 1;

FIG. 3 is an enlarged partial side view of a friction winch;

FIG. 4 is an enlarged top view of the friction winch; and

FIG. 5 is a schematic representation of another variant of a friction winch according to the invention.

DESCRIPTION OF THE PREFERRED EMBODIMENTS

Referring now to the figures of the drawing in detail and first, particularly, to FIGS. 1 and 2 thereof, there is shown a side view and top view, respectively, of a machine 1 for installing a contact wire (or also a carrying cable) of a catenary 3 of a track 4. For the sake of simplicity, the expression "catenary cable 2" will be used in the following as an expression encompassing both contact wire and carrying cable. The machine 1 comprises a machine frame 5, extending in a longitudinal direction, which is supported for mobility on the track 4 by two undercarriages 6. A motor 7 and a hydraulic unit 8 are provided on the machine frame 5 for the purpose of supplying energy to a motive drive 9 of the machine 1 and to all further drives yet to be described.

The catenary cable 2 (or contact wire) that is to be installed is wound on a storage drum 10 which is supported for rotation about an axis 11 on a transversely adjustable carriage 12. The latter, along with a friction winch 13 and a vertically adjustable telescopic column 14 having a mounting roller 36 arranged at its top, is fastened to a support frame 15. The support frame 15 is mounted on the machine frame 5 and pivotable relative thereto, with the aid of a drive 35, about an axis 16 extending in the longitudinal direction.

The friction winch 13 is composed of a first winch wheel 17, a second winch wheel 18, a third winch wheel 19, and fourth winch wheel 20—with regard to a winding direction 24 (indicated in FIG. 3)—each winch wheel being mounted for rotation independently of one another about an axis of rotation 21. The first and second winch wheels 17 and 18, arranged one behind the other in the longitudinal direction, as well as the third and fourth winch wheels 19 and 20 are in each case arranged in a common plane 22 and form a respective wheel pair 23. The two planes 22,22 extend parallel to one another.

With specific reference to FIG. 4, the first and second winch wheels 17 and 18 are disposed, with regard to their respective axes of rotation 21, co-axially to the third and fourth winch wheel 19 and 20, respectively. Associated in each case with the second, third and fourth winch wheel 18, 19 and 20 is a respective, separate hydraulic motor 25. The latter each have a different fluid displacement (for example, 1100, 1800 and 2800 ccm/rev) for achieving a torque which progressively increases in the winding direction 24 from the second winch wheel 18 via the third winch wheel 19 to the fourth winch wheel 20. The hydraulic motors 25 may, however, also be actuated selectively with different operating pressures by means of a control system 26 provided on the machine 1.

For receiving and guiding the catenary cable 2, each winch wheel 17 to 20 is provided with a cable groove 27 which, as shown in detail in FIG. 4, is configured to be wider on the second and third winch wheels 18 and 19 than on the first and fourth winch wheels 17 and 20.

During working operations, the machine 1 is driven continuously on the track 4 in a working direction indicated by an arrow 28 in FIG. 1. The catenary cable 2 is fastened to a bracket 29 of a catenary mast and, as a result of the continuous advance of the machine 1, is pulled from the friction winch 13 with a constant pull-off force 30 in order to achieve an installation tension as desired for the final installation of the catenary 3. By means of the friction winch 13, a pull-off resistance 31 counteracting the pull-off force 30 is produced at the fourth winch wheel 20. To that end, the catenary cable 2 is guided with a drum pull-off force 37 (see FIG. 3) from the storage drum 10 in a lower plane to the first winch wheel 17 and, in further sequence, to the second winch wheel 18, then from the latter in an upper plane to the third winch wheel 19 and finally, again in the lower plane, to the fourth winch wheel 20, while running in the respective cable groove 27.

Since the different torques of the hydraulic motors 25 increase gradually from one winch wheel to the next, an optimal force grip of the catenary cable 2 on the respective winch wheel 17 to 20 is assured. If desired, the first winch wheel 17 could also be provided with a hydraulic motor of its own. However, this would not be very expedient in as much as the enclosing angle of the catenary cable 2 on said first winch wheel 17 is very small.

According to FIG. 3, the fourth winch wheel 20 (the winch wheel 18 in front thereof is not shown) is fastened to a rocker 32 which is connected to the support frame 15 for pivoting about an axis 33 extending parallel to the axis of rotation 21. An opposite end of the rocker 32 is connected to the support frame 15 by means of a pressure measuring bolt 34. With this arrangement, in an advantageous way, the installation tension can be measured precisely and kept constant with the aid of a controlling system.

It is, of course, also possible to configure the machine 1—as disclosed in the above-mentioned U.S. Pat. No. 5,114,119—for simultaneously installing a complete catenary 3 (i.e. contact wire and carrying cable). To do so, a further storage drum 10, a second friction winch 13 and an additional mounting roller 36 would be needed. These may be arranged on the same or on a second support frame 15, as desired.

According to a variant of the invention which is represented in FIG. 5, the friction winch 13 may also be composed of a first, second and third winch wheel 17,18 and 19, with regard to the winding direction 24, which are all arranged in a common plane and with each of which a separate hydraulic motor 25 is associated. By means of the first winch wheel 17, the catenary cable 2 is pulled from a storage drum, not further shown, with a drum pull-off force 37 (which might be, for example, 5 kilonewton). Due to the increased torque of the second winch wheel 18, the cable tension is then raised to 15 kilonewton. By means of the third winch wheel 19, the cable tension, and with it the pull-off resistance 31, is finally increased to 25 kilonewton.

While the invention has been illustrated and described as embodied in a method and machine for installing a catenary cable of a catenary of a track, it is not intended to be limited to the details shown since various modifications and structural changes may be made without departing in any way from the spirit of the present invention.

We claim:

1. A method of installing a catenary cable of a catenary of a track, which comprises the following steps:

pulling the catenary cable from a storage drum with a given drum pull-off force;

guiding the catenary cable over winch wheels of a friction winch and subjecting the catenary cable to a given cable tension; and passing the catenary cable from the friction winch onto a mounting roller with a pull-off resistance for producing an installation tension, generating the pull-off resistance with the friction winch and counteracting a pull-off force of the catenary cable, and gradually increasing the cable tension between the winch wheels of the friction winch up to the pull-off resistance.

2. The method according to claim 1, wherein the catenary cable is a contact wire or a carrying cable wound upon the storage drum.

3. A method of installing a catenary cable of a catenary of a track, which comprises the following steps:
   pulling the catenary cable from a storage drum with a given drum pull-off force;
   guiding the catenary cable over winch wheels of a friction winch and subjecting the catenary cable to a given cable tension between the winch wheels;
   passing the catenary cable from the friction winch onto a mounting roller with a pull-off resistance for producing an installation tension; and
   generating the pull-off resistance for producing the installation tension with the friction winch and counteracting a pull-off force of the catenary cable, and increasing the cable tension between the wheels of the friction winch, from the drum pull-off force at a first winch wheel to the pull-off resistance at a last winch wheel.

* * * * *